Sept. 8, 1942.    A. ALFORD    2,294,882
AIRCRAFT LANDING SYSTEM
Filed Jan. 3, 1940    3 Sheets-Sheet 1
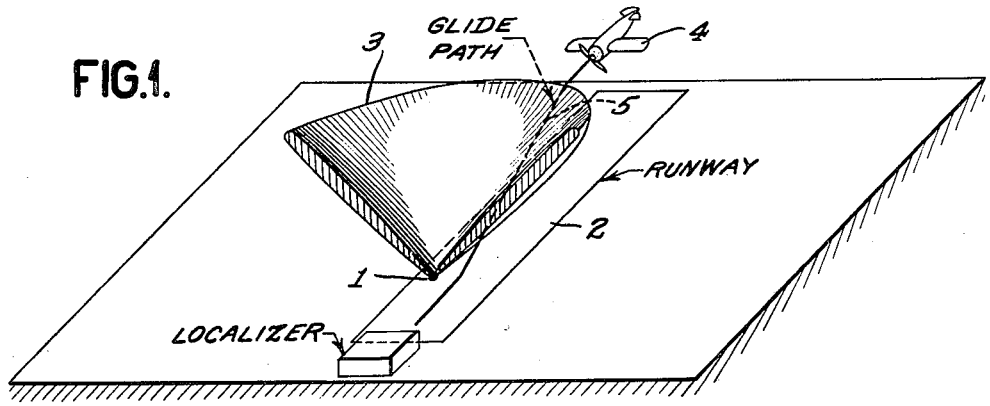
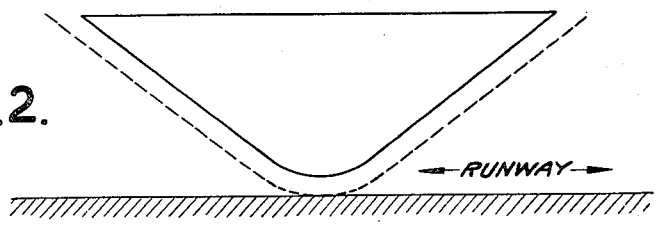
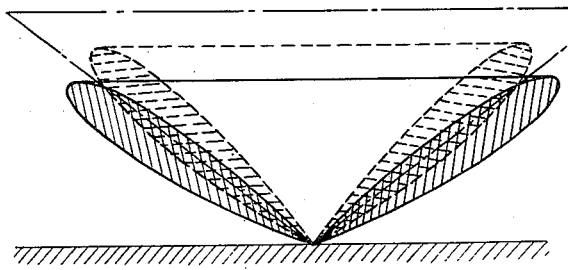
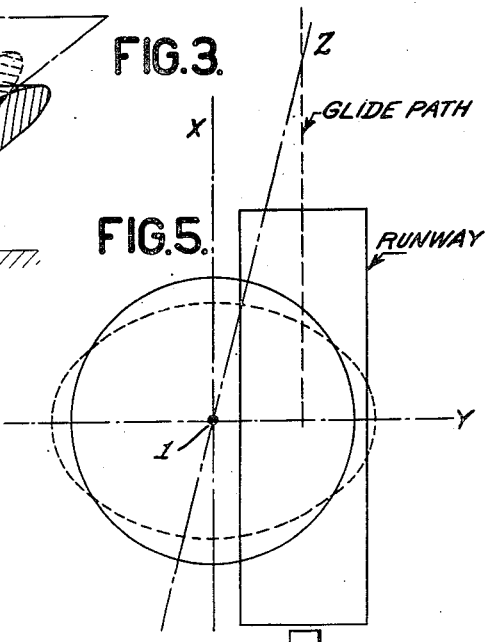
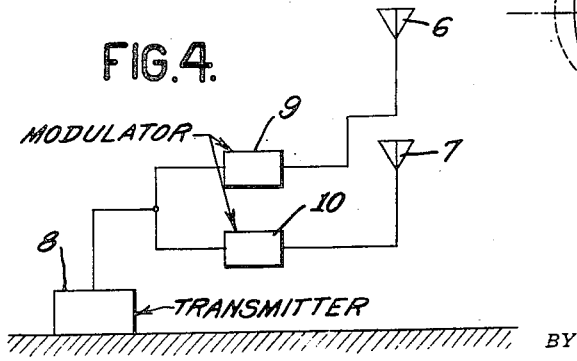
INVENTOR.
ANDREW ALFORD
ATTORNEY.

INVENTOR.
ANDREW ALFORD
BY
ATTORNEY.

Sept. 8, 1942.  A. ALFORD  2,294,882
AIRCRAFT LANDING SYSTEM
Filed Jan. 3, 1940  3 Sheets-Sheet 3

INVENTOR.
ANDREW ALFORD
BY
ATTORNEY.

Patented Sept. 8, 1942

2,294,882

UNITED STATES PATENT OFFICE 2,294,882

AIRCRAFT LANDING SYSTEM

Andrew Alford, New York, N. Y., assignor to International Telephone & Radio Manufacturing Corporation, a corporation of Delaware Application January 3, 1940, Serial No. 312,191

8 Claims. (Cl. 250—11)

My invention relates to aircraft glide paths and more particularly to an improved method and means for producing a glide path.

An object of my invention is to provide a glide path having a shape more readily adapted to land an aircraft.

A further object of my invention is to provide a method for producing a glide path having a hyperbolic or other desired shape.

A further object of my invention is to provide a glide path that allows the location of radiating antenna remote from a landing runway.

In order to obtain correct descending and landing speeds on an aircraft, a glide path that is in the form of a straight line at higher altitudes, 3000 feet to 300 feet for example, and a curve at lower altitudes, 300 feet to earth, is desirable. The types of glide path now in use are of two forms, parabolic or straight line. The parabolic or so-called curved glide path is too steep at high altitudes but has the correct shape at the point of landing. The straight line glide path has the correct shape at the higher altitudes, but if its slope is adjusted to be correct at the higher altitudes, it intersects the landing point at too sharp an angle. By my invention I provide a hyperbolic glide path whose shape in the higher altitudes is substantially straight and in the lower altitudes is curved, or a glide path whose shape is readily adjustable so as to remove the above-mentioned difficulties.

My invention may be more easily understood by the description in connection with the following drawings wherein:

Fig. 1 illustrates an embodiment of my invention using a single radiation pattern;

Fig. 2 illustrates a glide path obtained by the arrangement of Fig. 1;

Fig. 3 illustrates a further embodiment of my invention using two radiation patterns;

Fig. 4 shows an antenna arrangement for obtaining the embodiment of Fig. 3;

Figs. 5 and 5a show in plan view and in section plan, respectively, field patterns of other embodiments of my invention;

Fig. 5b shows an antenna arrangement for producing the patterns of Figs. 5 and 5a;

Figure 5A:
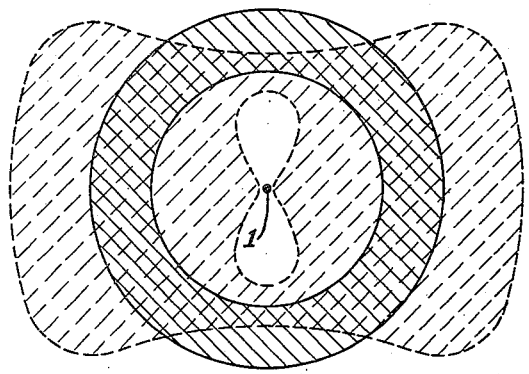

It is well known that a plane intersecting a right circular cone parallel to the axis of the cone traces a hyperbola at the intersections of the plane and the cone surface. Sharply directive substantially conical radiation patterns may be produced by known means. If the source of this radiation is located at one side of a landing runway and an aircraft passes through this radiation along a path of constant signal intensity and in a plane other than a plane passing through the axis of said radiation, the aircraft will descend along a hyperbolic path. Fig. 1 shows in perspective, a landing field and runway and a partially sectioned view of a substantially right circular conical radiation pattern. A source I displaced with respect to the runway 2 radiates sharply directive energy substantially in the shape of a hollow cone 3. A localizer beam (not shown) directed along the runway 2 guides an aircraft 4 in the horizontal direction along a predetermined course, and as the aircraft proceeds it finally intersects cone 3 and descends along a glide path 5. This path takes the form of a hyperbola as explained above. The aircraft may also be guided by other means such as a compass once it has assumed a predetermined position with respect to the runway.

It is obvious, however, that when the apex of the cone is located at the ground, no hyperbolic path can be followed that will come exactly to ground. It will be realized that since an aircraft receiving antenna has considerable height when the wheels of the aircraft are on the ground, by choosing the correct angle that the cone surface makes with ground and/or the correct signal intensity, there will be a hyperbolic path that will bring the aircraft to ground. In Fig. 2 the path of constant signal intensity of Fig. 1 is shown by a solid line and the path that would be followed by an aircraft is shown as a dotted line.

A preferred method of producing a hyperbolic path is illustrated in Fig. 3. If two beams of energy are emitted as in this figure, their intersection points of equal signal strength form a substantially straight line, and since the beams may be made to have the same cross-section in any vertical plane, the paths of equal signal strength will form a right circular cone as shown by the dot-dash line. This cone may be utilized in the same manner as the cone of Fig. 1.

In the preferred embodiment of my invention an equal signal cone like that of Fig. 3 is formed by two horizontal loop antennae, 6 and 7, of the type shown in my co-pending application Serial 270,173, filed April 26, 1939, erected one above the other as shown in Fig. 4, and these antennae are preferably mounted at some distance from the landing runway. The two antennae 6 and 7 are energized by a common source 8 and the energy is modulated by modulators 9 and 10 which may modulate the energy by any known form such as Morse code or differing frequencies. The angle that the equal signal cone makes with the ground may be readily adjusted to a desired value by changing the relative energy supplied to either or both antennae.

An arrangement of the above type has two distinct advantages over the embodiment of Fig. 1 in that the receiver on the aircraft may be so adjusted that an equal signal or "on course" indication is obtained when one signal is higher than the other, the apparent glide path then appearing below the true path as shown by the dotted line of Fig. 2, thus bringing the craft directly to ground, and the stability of such a path is considerably greater than a constant signal path since changes in the receiver sensitivity will usually affect the signals from both beams equally.

If it is desired to follow an equal signal path and not vary the receiver sensitivity, the path may be adjusted to come directly to earth by varying the energization or radiation patterns of one or both radiating antennae, thereby forming cones that are not right circular but conical surfaces of irregular bases as formed by a straight line revolving through a closed path and passing through a fixed vertex. Consider two similar radiators A and B at a height H and $h$ above the ground respectively. If the current in A is $I_A$ and the current in B is $I_B$, then the field at a point P at an angle $\phi$ with respect to the horizon and distance $r$ is given as follows:

$$\text{Field from } A = \frac{K}{r} I_A \sin\left(\frac{2\pi}{\lambda} H \sin \phi\right) \quad (a)$$

$$\text{Field from } B = \frac{K}{r} I_B \sin\left(\frac{2\pi}{\lambda} h \sin \phi\right) \quad (b)$$

When the aircraft is at a great distance, these fields should be equal, or substantially equal, at some convenient angle of descent, say $\phi = \phi_0 = 3.2°$ which is a convenient slope of 900 feet in 3 miles. It follows that the ratio of the antenna currents $I_A/I_B$ must be:

$$\frac{K}{r} I_A \sin\left(\frac{2\pi}{\lambda} H \sin \phi_0\right) = \frac{K}{r} I_B \sin\left(\frac{2\pi}{\lambda} h \sin \phi_0\right) \quad (c)$$

or with $\phi_0 = 3.2°$ $$\frac{I_A}{I_B} = \frac{\sin\left(\frac{2\pi}{\lambda} H \sin 3.2°\right)}{\left(\frac{2\pi}{\lambda} h \sin 3.2°\right)} \quad (d)$$

At the point of contact the two fields should be equal at a much smaller value of $\phi$ because the aircraft antenna is at a small elevation above the ground, hence the ratio of $I_A/I_B$ should be:

$$\frac{I_A}{I_B} = \frac{\sin\left(\frac{2\pi}{\lambda} H \sin \phi\right)}{\left(\frac{2\pi}{\lambda} h \sin \phi\right)} \quad (e)$$

as $\lim \phi$ $$\frac{I_A}{I_B} \to \frac{\frac{2\pi}{\lambda} H \phi}{\frac{2\pi}{\lambda} h \phi} = \frac{H}{h} \quad (f)$$

The value of $I_A/I_B$ given by Equation $d$ is, of course, different from that given by Equation $f$. However, since the glide path antenna system is placed at a distance off the runway as shown in Fig. 1, it is clear that the position of the aircraft as seen from the antennae at the beginning of the descent is different from its position at the point of contact. Because in Equations $a$ and $b$, $I_A$ and $I_B$ are seen to be multiplied by the ratio of radiation in various directions, it is therefore possible to adjust the horizontal directional characteristics of the radiating antennae and to choose a ratio of $I_A$ and $I_B$ so that both Equations $d$ and $f$ are satisfied.

Figure 5B:
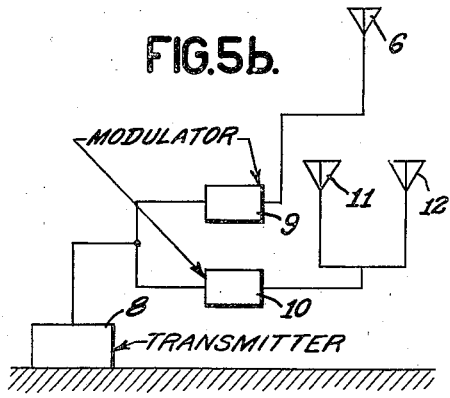

Figs. 5 and 5a illustrate one type of field pattern combination that may be used to obtain the above result, and Fig. 5b is an antenna arrangement for producing these patterns. In the plan view of Fig. 5 the full line represents the radiation from an antenna having a circular pattern of substantially constant magnitude. The dotted line represents the radiation from a pair of loop antennae 11 and 12 below said first-mentioned antenna 6 having a pattern whose angle with the ground is substantially constant but whose magnitude and shape vary. Fig. 5a is a cross section in a horizontal plane of the patterns of Fig. 5 showing more clearly how the magnitudes or shapes vary.

Figure 6A:
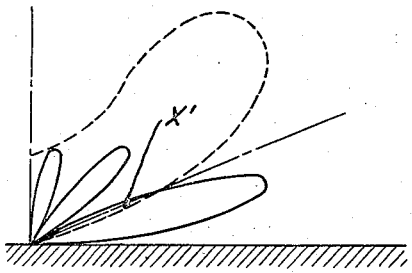
Figs. 6a–6c are a series of vertical sections of the patterns taken along line Y of Fig. 5.
Figure 6B:
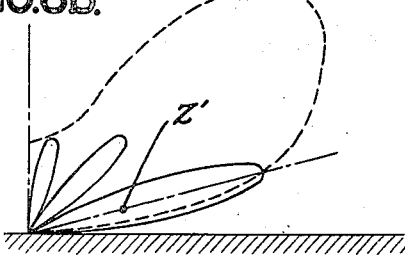
Figure 6C:
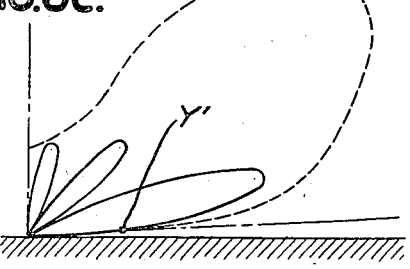

When the aircraft is at a considerable distance from the source 1, it receives signals substantially along a line X. As it approaches the runway along a localizer beam, it receives signals along some line Z, and finally, if the patterns are so adjusted, it will receive signals along a line Y at the point of contact. Figs. 6a to 6c are sections taken along plane Y of half of the radiation patterns showing how the path followed by the aircraft gradually approaches the earth. At a great distance the aircraft will follow a path at some small angle to the equal signal dot-dash line and will be located at a point X'. As the aircraft approaches the runway from Fig. 5a, it may be seen that the upper radiation pattern widens and it may also length thereby lowering the angle that the equal signal line makes with the ground. The aircraft in this second position assumes the position at Z' (Fig. 6b). Similarly, at the point of contact the line of equal signal strength has a very low angle, being practically zero, and the aircraft lands at position Y'. To aid in bringing the aircraft to earth a receiver having a variable sensitivity may also be used.

Figure 7:
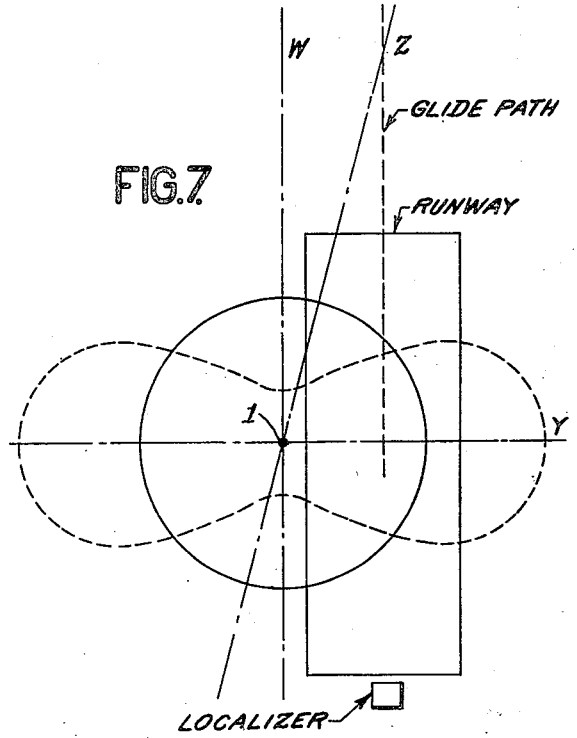
Figs. 7 and 7a show in plan view and in section plan, respectively, field patterns according to another embodiment of my invention.
Figure 7A:
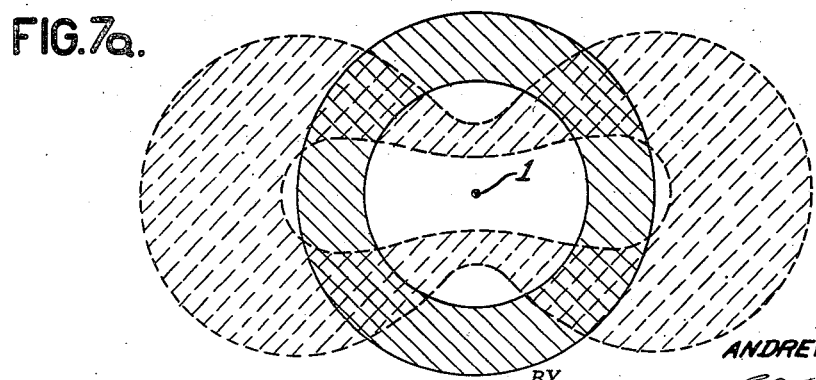

Figs. 7 and 7a illustrate a second type of field pattern combination that may be used to control the glide path slope and point of contact. In the plan view of Fig. 7 the full line represents the radiation from an antenna having a circular pattern of substantially constant magnitude. The dotted line represents the radiation from a lower pair of antennae having a pattern whose angle with the ground and magnitude and shape vary. Fig. 7a is a cross-section in a horizontal plane of the patterns of Fig. 7 showing more clearly how the shapes and angle vary.

Figure 8A:
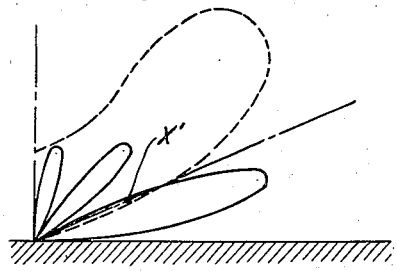
Figs. 8a–8c show vertical sections of the patterns taken along line Y of Fig. 7.
Figure 8B:
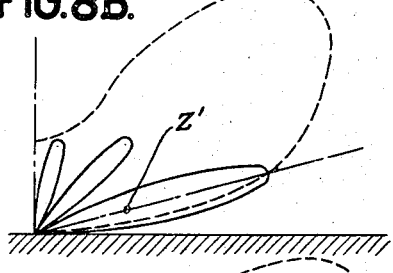
Figure 8C:
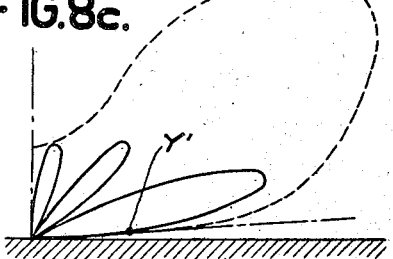

Figs. 8a and 8c in a manner similar to that of Figs. 6a to 6c illustrate how the angle that the line of equal signal strength makes with the ground decreases in approaching the landing runway. At a distance the angle is high and the aircraft is at a position X'; nearer the runway the angle decreases and the aircraft assumes a position at Z'; finally, when the angle is almost zero, the aircraft lands at a position Y'.

It is also possible to adjust the lower field pattern so that only the angle or the magnitude or the shape of the beams vary or any combination of these variables may be used. Instead of making the lower antenna directional, the upper antenna may be made directional, or both of the antennae may be made directional. By varying the directional characteristics of one or both antennae, it is possible to make the glide path not only concave but also convex, or it may be made to come down, or up, and then come down, etc. The landing path may also be varied in shape by varying the angle the localizer beam plane makes with the ground, by making the beams that form the cone of irregular shape, or by tilting the axis of the antenna system.

It is readily apparent to those skilled in the are that antennae other than loop antennae may be employed, and it is not necessary that a full cone be provided, a conical section being provided, for example, only in the quadrant or quadrants utilized for aircraft approach.

Figure 9:
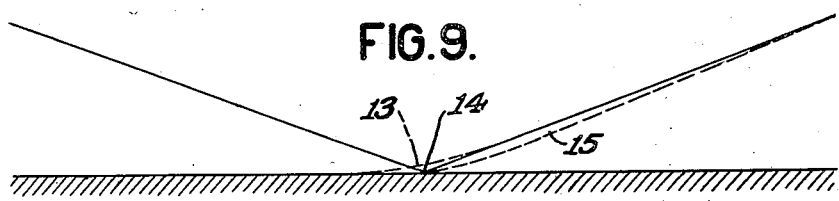
Fig. 9 is a diagram for explaining the production of a landing path.

It has been shown that a hyperbolic path made from a conical section does not touch the ground unless special radiation patterns or special devices are used. At a distance this path is substantially a straight line having a predetermined angle with respect to the ground, and near the point of contact the path is curved. In Fig. 9 the straight line portion of the path is shown by a full line. If the aircraft is to land at a point 14, it must follow the path indicated by the full line for a distance and drop down at the curved portion of path near the point of contact. However, a path of this type is not hyperbolic in form but has an irregularity at the dropping down region. It is possible to eliminate this irregularity by lowering the entire path as shown by path 15, but at a distance it is difficult to shape the path since the rate at which the aircraft is passing by or going around the antenna system is very small.

Another solution is to use the straight line portion without modification and change the point of contact so that it is beyond the point at which the straight line portion would intersect the ground and to adjust the lower portion of the path so that it is a curved portion added to the straight line portion and extending to the new point of contact. A path of this latter type is illustrated by path 13 in Fig. 9.

Figure 10:
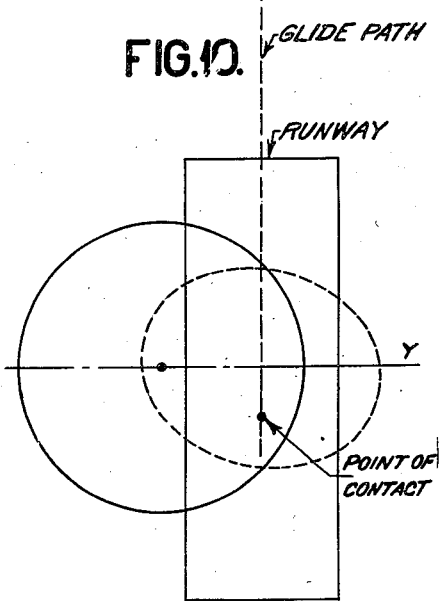
Fig. 10 shows in plan a still further embodiment for producing a desired landing path.

The second path mentioned above could be obtained by rotating the dumbell patterns previously shown so that they are asymmetrical with respect to the Y axis. A further arrangement for producing the path is shown in Fig. 10 wherein a circular pattern is combined with an off-center elliptical pattern that is asymmetrical with respect to the axis Y. It is relatively easy to produce changes in the lower portion of the glide path since the angle that an aircraft makes with the axis of the antenna system is varying at a fairly rapid rate, and therefore the curvature of the lower portion of the glide path may be readily adjusted by varying the shape of the elliptical pattern or both patterns.

It will be understood that any of the cones I have described need not be right circular cones unless for the express purpose of producing a particular continuous hyperbola. Unless specifically limited in the appended claims, all references to a cone or conic section refer to a cone described by a substantially straight line revolved through a closed path and passing through a fixed vertex and to a conic section formed by the intersection of said cone and any surface.

While I have described particular embodiments of my invention for purposes of illustration, it will be understood that various modifications and adaptations thereof may be made within the spirit of the invention as set forth in the appended claims.

What is claimed is:

1. An arrangement for producing a glide path for aircraft comprising means for providing indication for directing an aircraft horizontally along a predetermined course, and a single means for producing a zone of radio frequency signals substantially in the shape of at least a portion of a hollow substantially linear conical surface having its apex substantially at the ground and displaced laterally to one side of said course, said conical portion overlapping said course the intersection of said conical portion and said course having a substantially straight line portion with a constant angle of descent during the greater part of the path, and a curved portion with a decreasing angle of descent near the surface of the earth.

2. In a system for landing an aircraft the method which comprises producing a sharply directive radiation pattern substantially in the shape of a hollow substantially linear conical surface having its apex substantially at the ground, directing said aircraft horizontally along a course line displaced laterally an appreciable distance from said apex and intersecting said conical surface, and directing said aircraft vertically along a glide path in the shape of a conic section determined by the intersection of said conical surface and said course line.

3. An arrangement for landing an aircraft comprising means for providing indications for directing an aircraft horizontally along a predetermined course, means for producing a first radiation pattern of predetermined shape, means for producing a second radiation pattern intersecting said first pattern, said first and second radiation patterns together forming signal paths in the shape of at least a portion of a cone, having its apex at the ground and displaced laterally with respect to said course, said conical portion overlapping said course, and means for indicating a guide line for said aircraft vertically along a glide path determined by the intersection of said radiation patterns and said course.

4. An arrangement according to claim 3 wherein said means for producing a first radiation pattern and said means for producing a second radiation pattern comprise a first radiating antenna and at least one other antenna mounted below said first antenna and substantially symmetrical with respect to a vertical axis passing through said first antenna.

5. An arrangement according to claim 3 wherein means is provided for giving said glide path a desired shape by controlling the directivity of at least one of said radiation patterns.

6. An arrangement for producing a glide path comprising radiating means for producing a localizer beam to provide an indication for directing an aircraft horizontally along a predetermined course, a first radiating antenna for producing a radiation pattern of predetermined shape, a pair of radiating antennae mounted below said first antenna for producing a second radiation pattern of predetermined shape intersecting said first pattern, the intersection of said first and second patterns forming signal paths in the shape of a cone having its apex at the ground and displaced laterally with respect to said course, said cone overlapping said course.

7. An arrangement according to claim 6 wherein means is provided to control the energization of at least one of said antennae to adjust the shape of said glide path.

8. An arrangement for producing a substantially hyperbolic glide path comprising radiating means for producing a localizer beam in a vertical plane to provide an indication for directing an aircraft horizontally along a predetermined course, a first radiating antenna for producing a radiation pattern of predetermined shape, a radiating antenna mounted below said first antenna for producing a second radiation pattern of predetermined shape intersecting said first pattern, the intersection of said first and second patterns forming signal paths in the shape of a right circular cone having its apex at the ground and displaced laterally with respect to said course, said cone overlapping said course.

ANDREW ALFORD.